United States Patent
Letondor et al.

(10) Patent No.: US 10,385,155 B2
(45) Date of Patent: Aug. 20, 2019

(54) SUBSTRATE INCLUDING A SURFACE COATED WITH AN EPILAME AGENT AND METHOD FOR COATING SUCH A SUBSTRATE WITH EPILAME

(71) Applicant: The Swatch Group Research and Development Ltd, Marin (CH)

(72) Inventors: Christophe Letondor, Le Landeron (CH); Claire Rannoux, Morges (CH)

(73) Assignee: The Swatch Group Research and Development Ltd, Marin (CH)

( * ) Notice: Subject to any disclaimer, the term of this patent is extended or adjusted under 35 U.S.C. 154(b) by 69 days.

(21) Appl. No.: 15/672,510

(22) Filed: Aug. 9, 2017

(65) Prior Publication Data
US 2018/0057629 A1    Mar. 1, 2018

(30) Foreign Application Priority Data

Sep. 1, 2016 (EP) .................................. 16186842

(51) Int. Cl.
*C09D 133/16*    (2006.01)
*C08F 293/00*    (2006.01)
(Continued)

(52) U.S. Cl.
CPC ............ *C08F 293/005* (2013.01); *B05D 1/18* (2013.01); *B05D 3/0254* (2013.01);
(Continued)

(58) Field of Classification Search
None
See application file for complete search history.

(56) References Cited

U.S. PATENT DOCUMENTS 7,713,541 B1 * 5/2010 Pacetti .................. A61L 27/34
                                                                424/423
7,928,176 B2 * 4/2011 Pacetti .................. A61L 27/34
                                                                526/277
(Continued)

FOREIGN PATENT DOCUMENTS

| EP | 2 749 582 A1 | 7/2014 |
| EP | 3 070 133 A1 | 9/2016 |
| WO | WO 2014/100580 A1 | 8/2014 |

OTHER PUBLICATIONS

Lu et al. "Using fluorine-containing amphiphilic random copolymers to manipulate the quantum yields of aggregation-induced emission fluorophores in aqueous solutions and the use of these polymer for fluorescent bioimaging" J. Mater. Chem. 2012, 22, 9890-9900. (Year: 2012).*

(Continued)

*Primary Examiner* — Robert S Loewe
(74) *Attorney, Agent, or Firm* — Oblon, McClelland, Maier & Neustadt, L.L.P.

(57) ABSTRACT

The invention relates to a copolymer and a substrate having a surface, at least one part of which is coated with an epilame agent comprising at least one compound in the form of a copolymer comprising V units, N units, optionally at least one M unit, and optionally at least one P unit, linked by covalent bonds by their main chains, wherein (Continued)

-continued

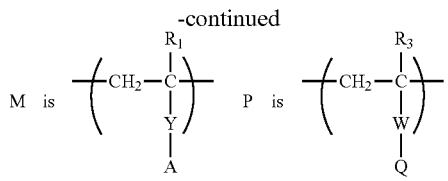

wherein W, X, Y, Z are spacer arms, T is a tracer group arranged to determine the concentration of epilame agent in an epilame-coating bath, L is a halogenated, preferably fluorinated, $C_1$-$C_{20}$ carbon moiety, A is a substrate anchoring moiety, Q is H, $CH_3$, or a hydrocarbon chain different from T.

The invention also concerns a method for coating such a substrate with epilame, said method comprising a step of checking the concentration of epilame agent in the epilame-coating bath by means of the tracer group and if necessary, a step of readjusting the concentration of epilame agent in the epilame-coating bath.

35 Claims, 2 Drawing Sheets

(51) Int. Cl.

| | |
|---|---|
| *B05D 1/18* | (2006.01) |
| *B05D 3/02* | (2006.01) |
| *C09D 153/00* | (2006.01) |
| *C08F 220/24* | (2006.01) |
| *C10M 107/28* | (2006.01) |
| *C10M 107/38* | (2006.01) |
| *C10M 107/42* | (2006.01) |
| *C10M 107/46* | (2006.01) |
| *C10M 107/50* | (2006.01) |
| *C10M 109/00* | (2006.01) |

(52) U.S. Cl.
CPC .......... *C08F 220/24* (2013.01); *C09D 133/16* (2013.01); *C09D 153/00* (2013.01); *C10M 107/28* (2013.01); *C10M 107/38* (2013.01); *C10M 107/42* (2013.01); *C10M 107/46* (2013.01); *C10M 107/50* (2013.01); *C10M 109/00* (2013.01); *C10M 2209/0845* (2013.01); *C10M 2217/0245* (2013.01); *C10M 2217/0285* (2013.01); *C10M 2221/025* (2013.01); *C10M 2229/003* (2013.01); *C10N 2230/26* (2013.01); *C10N 2240/06* (2013.01)

(56) References Cited

U.S. PATENT DOCUMENTS

| | | | | |
|---|---|---|---|---|
| 8,951,630 | B2* | 2/2015 | Tosatti | B05D 1/185 |
| | | | | 106/287.23 |
| 2010/0310875 | A1* | 12/2010 | Hao | C08G 65/007 |
| | | | | 428/413 |
| 2011/0077349 | A1* | 3/2011 | Hoshino | C08F 220/18 |
| | | | | 524/544 |
| 2012/0032093 | A1 | 2/2012 | Moore et al. | |
| 2013/0216837 | A1* | 8/2013 | Iyer | C08F 220/24 |
| | | | | 428/422 |
| 2013/0234063 | A1 | 9/2013 | Moore et al. | |
| 2014/0288231 | A1 | 9/2014 | Fujita et al. | |
| 2015/0175460 | A1 | 6/2015 | Moore et al. | |
| 2015/0197661 | A1* | 7/2015 | Richard | C10M 107/28 |
| | | | | 428/421 |
| 2015/0337096 | A1 | 11/2015 | Olson et al. | |
| 2016/0272749 | A1* | 9/2016 | Letondor | C10M 107/38 |
| 2016/0272842 | A1 | 9/2016 | Letondor et al. | |

OTHER PUBLICATIONS

European Search Report dated Nov. 30, 2016 in European Application 16186842.7, filed on Sep. 1, 2016 (with English Translation of Categories of cited documents).

* cited by examiner

SUBSTRATE INCLUDING A SURFACE COATED WITH AN EPILAME AGENT AND METHOD FOR COATING SUCH A SUBSTRATE WITH EPILAME

This application claims priority from European patent application No. 16186842.7 filed Sep. 1, 2016, the entire disclosure of which is hereby incorporated herein by reference.

FIELD OF THE INVENTION

The present invention relates to the field of mechanics and in particular to the field of horology or jewellery. It more particularly concerns a copolymer, in addition to a substrate, particularly a substrate for an element of a timepiece or piece of jewellery comprising a surface at least partially coated with an epilame agent comprising such a copolymer. It also concerns a method for coating such a substrate with epilame, and a timepiece or piece of jewellery comprising an element comprising such a substrate.

BACKGROUND OF THE INVENTION

There are various methods for modifying the surface state of a substrate through a treatment using an appropriate agent to specifically improve certain surface properties. For example, in the field of mechanics, and in particular in the field of horology, but also in the field of jewellery, a surface of a piece or an element is often epilamized with an epilame agent to control and reduce the surface energy of said surface during use. More specifically, the purpose of an epilame agent is to prevent the spreading of oils or lubricants on the elements of a timepiece or piece of jewellery by forming a hydrophobic and lipophobic surface allowing the lubricant to remain in a predetermined place on the treated surface.

The standard epilame coating method is a dip coating process. It consists in dipping the timepiece in an epilame-coating bath, i.e. a solution of epilame agent in a solvent in a given concentration. The epilame effect depends on the concentration of epilame agent. In industry, the same epilame-coating bath is used for the epilame coating of timepieces for several months. Gradually as it is used, the quantity of epilame agent in the bath decreases (part of the epilame agent remains adsorbed/clings to the timepieces and the quantity of solvent in the epilame agent solution also decreases via evaporation. Thus, during use, the concentration of epilame agent in the epilame-coating bath changes. To limit these fluctuations, in industry, a concentrated solution of the epilame agent and/or solvent is regularly added to the epilame-coating bath. However, these additions are made in a very empirical manner, given that the current epilame-coating process does not allow precise information to be obtained as to the concentration of epilame agent. This results in epilame effects that vary significantly from one batch to another.

SUMMARY OF THE INVENTION

It is an object of the invention to overcome the various drawbacks of known epilame agents and known epilame-coating processes.

More precisely, it is an object of the invention to provide an epilame agent and an epilame-coating process that make it possible to know precisely the concentration of epilame agent over time, in order to make the overall epilame-coating process more robust.

To this end, the present invention concerns a copolymer comprising V units, N units, optionally at least one M unit and optionally at least one P unit, linked by covalent bonds by their main chains, wherein V is

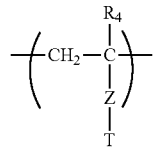

N is

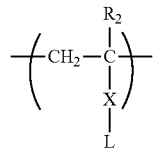

M is

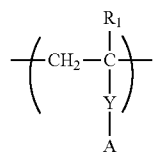

P is

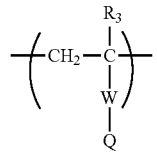

where $R_1$, $R_2$, $R_3$, $R_4$, which may be identical or different, are H, a $C_1$-$C_{10}$ alkyl group, $C_1$-$C_{10}$ alkenyl group, and preferably H, $CH_3$.

W, X, Y, Z, which may be identical or different, are spacer arms formed of a heteroatom or of a hydrocarbon chain that may contain at least one linear or branched heteroatom comprising at least one carbon atom.

T, which may be identical or different, is a tracer group arranged to determine the concentration of copolymer in a medium L, which may be identical or different, is a halogenated, preferably fluorinated, $C_1$-$C_{20}$ carbon moiety.

A, which may be identical or different, forms an anchoring moiety for the substrate, and is chosen from the group comprising thiols, thioethers, thioesters, sulphides, thioamides, silanols, alkoxysilanes, silane halides, hydroxyls, phosphates, protected or non-protected phosphonic acids, protected or non-protected phosphonates, amines, ammoniums, nitrogenated heterocycles, carboxylic acids, anhydrides, catechol.

Q, which may be identical or different, is H, CH$_3$, a hydrocarbon chain different from T that may contain at least one linear or branched, saturated or unsaturated heteroatom, comprising at least 2 carbon atoms.

The present invention also concerns a substrate having a surface, at least one part of which is coated with an epilame agent, said epilame agent comprising at least one compound in the form of a copolymer comprising V units, N units, optionally at least one M unit, and optionally at least one P unit, linked by covalent bonds by their main chains, where V is

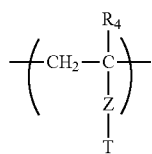

N is

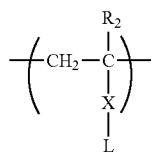

M is

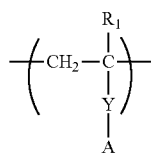

P is

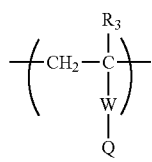

where R$_1$, R$_2$, R$_3$, R$_4$, which may be identical or different, are H, a C$_1$-C$_{10}$ alkyl group, C$_1$-C$_{10}$ alkenyl group, and preferably H, CH$_3$.

W, X, Y, Z, which may be identical or different, are spacer arms formed of a heteroatom or of a hydrocarbon chain that may contain at least one linear or branched heteroatom comprising at least one carbon atom.

T, which may be identical or different, is a tracer group arranged to determine the concentration of epilame agent in an epilame-coating bath.

L, which may be identical or different, is a halogenated, preferably fluorinated, C$_1$-C$_{20}$ carbon moiety.

A, which may be identical or different, forms an anchoring moiety for the substrate, and is chosen from the group comprising thiols, thioethers, thioesters, sulphides, thioamides, silanols, alkoxysilanes, silane halides, hydroxyls, phosphates, protected or non-protected phosphonic acids, protected or non-protected phosphonates, amines, ammoniums, nitrogenated heterocycles, carboxylic acids, anhydrides, catechol.

Q, which may be identical or different, is H, CH$_3$, a hydrocarbon chain different from T that may contain at least one linear or branched, saturated or unsaturated heteroatom, comprising at least 2 carbon atoms.

Such an epilame agent makes it possible to monitor and track the evolution of its concentration over time in the epilame-coating bath.

The invention also concerns a method for coating with epilame at least one part of a substrate surface comprising the steps of:

a) preparing an epilame-coating bath containing an epilame agent comprising at least one copolymer as defined above b) optionally, preparing the substrate surface c) monitoring the concentration of epilame agent in the epilame-coating bath by means of the tracer group d) optionally readjusting the concentration of epilame agent in the epilame-coating bath e) placing the substrate surface in contact with the epilame agent in the epilame-coating bath f) drying.

The present invention also concerns the use, as epilame agent for at least part of a surface of a substrate, particularly intended for horology or jewellery, of a copolymer comprising V units, N units, optionally at least one M unit and optionally at least one P unit, linked by covalent bonds by their main chains, wherein V is

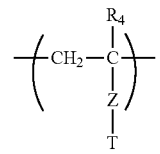

N is

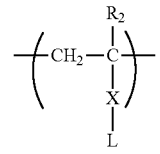

M is

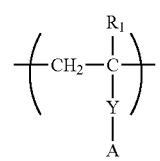

P is

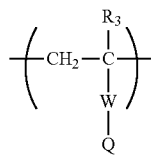

where $R_1, R_2, R_3, R_4$, which may be identical or different, are H, a $C_1$-$C_{10}$ alkyl group, $C_1$-$C_{10}$ alkenyl group, and preferably H, $CH_3$.

W, X, Y, Z, which may be identical or different, are spacer arms formed of a heteroatom or of a hydrocarbon chain that may contain at least one linear or branched heteroatom comprising at least one carbon atom.

T, which may be identical or different, is a tracer group arranged to determine the concentration of epilame agent in an epilame-coating bath.

L, which may be identical or different, is a halogenated, preferably fluorinated, $C_1$-$C_{20}$ carbon moiety.

A, which may be identical or different, forms an anchoring moiety for the substrate, and is chosen from the group comprising thiols, thioethers, thioesters, sulphides, thioamides, silanols, alkoxysilanes, silane halides, hydroxyls, phosphates, protected or non-protected phosphonic acids, protected or non-protected phosphonates, amines, ammoniums, nitrogenated heterocycles, carboxylic acids, anhydrides, catechol.

Q, which may be identical or different, is H, $CH_3$, a hydrocarbon chain different from T, which may contain at least one linear or branched, saturated or unsaturated heteroatom, comprising at least 2 carbon atoms, to monitor the concentration of epilame agent in an epilame-coating bath.

The present invention also concerns a timepiece or piece of jewellery with an element comprising a substrate as defined above.

BRIEF DESCRIPTION OF THE DRAWINGS

Other features and advantages will appear clearly from the following description, given by way of non-limiting illustration, with reference to the annexed drawings, in which.

DETAILED DESCRIPTION OF THE INVENTION

Figure 1:
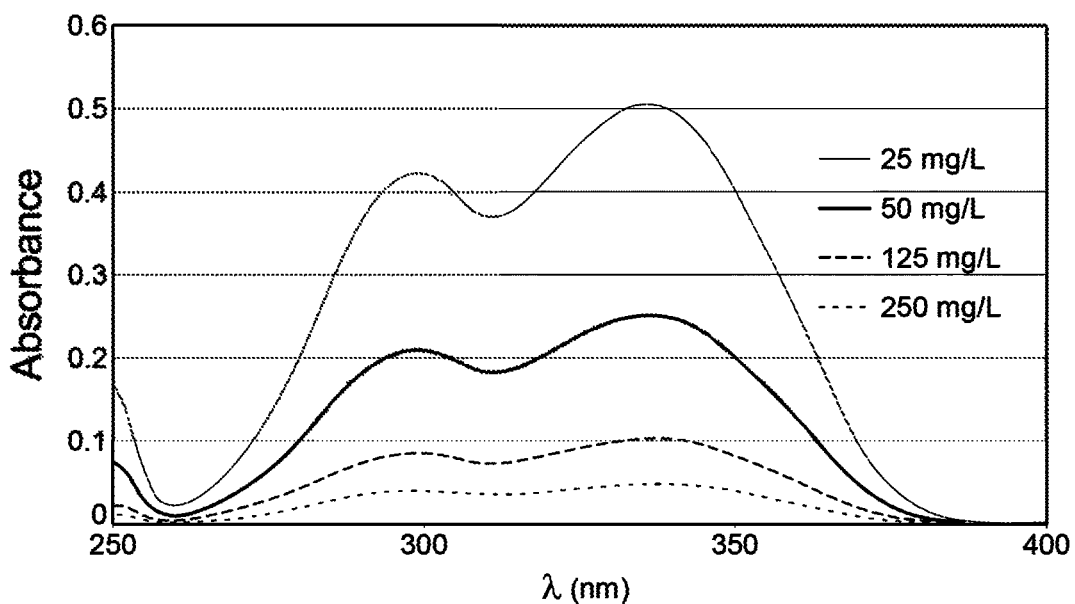
FIG. 1 represents absorbance curves as a function of wavelength for different concentrations of copolymer I in a solvent.

According to the invention, a substrate, particularly a substrate of an element for a timepiece or piece of jewellery, has a surface, at least one part of which is coated with an epilame agent, said epilame agent comprising at least one compound in the form of a copolymer comprising V units, N units, optionally at least one M unit and optionally at least one P unit, linked by covalent bonds by their main chains, wherein V is

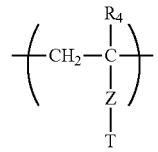

N is

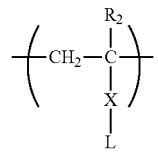

M is

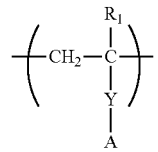

P is

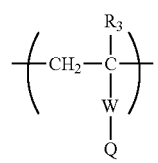

where $R_1, R_2, R_3, R_4$, which may be identical or different, are H, a $C_1$-$C_{10}$ alkyl group, $C_1$-$C_{10}$ alkenyl group, and preferably H, $CH_3$.

W, X, Y, Z, which may be identical or different, are spacer arms formed of a heteroatom or of a hydrocarbon chain that may contain at least one linear or branched heteroatom comprising at least one carbon atom.

T, which may be identical or different, is a tracer group arranged to determine the concentration of epilame agent in an epilame-coating bath.

L, which may be identical or different, is a halogenated, preferably fluorinated, $C_1$-$C_{20}$ carbon moiety.

A, which may be identical or different, forms an anchoring moiety for the substrate, and is chosen from the group comprising thiols, thioethers, thioesters, sulphides, thioamides, silanols, alkoxysilanes, silane halides, hydroxyls, phosphates, protected or non-protected phosphonic acids, protected or non-protected phosphonates, amines, ammoniums, nitrogenated heterocycles, such as imidazole or pyridine, carboxylic acids, anhydrides, catechol.

Q, which may be identical or different, is H, $CH_3$, a hydrocarbon chain different from T that may contain at least one linear or branched, saturated or unsaturated heteroatom, comprising at least 2 carbon atoms.

The invention also concerns a copolymer intended to form the epilame agent, and comprising V units, N units, optionally at least one M unit and optionally at least one P unit, linked by covalent bonds by their main chains, wherein V is

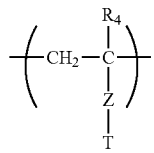

N is

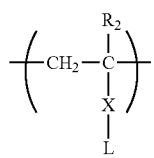

M is

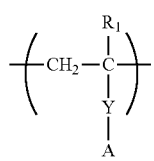

P is

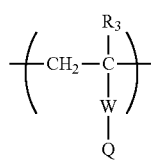

where $R_1$, $R_2$, $R_3$, $R_4$, which may be identical or different, are H, a $C_1$-$C_{10}$ alkyl group, $C_1$-$C_{10}$ alkenyl group, and preferably H, $CH_3$, W, X, Y, Z, which may be identical or different, are spacer arms formed of a heteroatom or of a hydrocarbon chain that may contain at least one linear or branched heteroatom comprising at least one carbon atom.

T, which may be identical or different, is a tracer group arranged to determine the concentration of copolymer in a medium L, which may be identical or different, is a halogenated, preferably fluorinated, $C_1$-$C_{20}$ carbon moiety.

A, which may be identical or different, forms a substrate anchoring group, and is chosen from the group comprising thiols, thioethers, thioesters, sulphides, thioamides, silanols, alkoxysilanes, silane halides, hydroxyls, phosphates, protected or non-protected phosphonic acids, protected or non-protected phosphonates, amines, ammoniums, nitrogenated heterocycles, such as imidazole or pyridine, carboxylic acids, anhydrides, catechol.

Q, which may be identical or different, is H, $CH_3$, a hydrocarbon chain different from T that may contain at least one linear or branched, saturated or unsaturated heteroatom, comprising at least 2 carbon atoms.

Preferably, the copolymer only comprises V, N and optionally M and/or P units.

The copolymer of the invention may be a statistical copolymer in which the V, N, M and P units are statistically linked by their main chain, i.e. distributed randomly, such that the statistical copolymer can be written in the form:

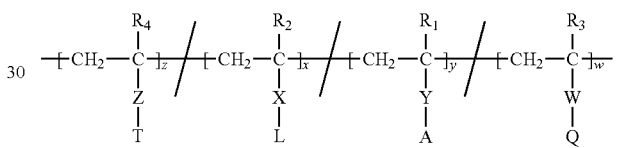

The copolymer of the invention may be a block copolymer comprising at least one block of V units linked by covalent bonds by their main chains, at least one block of N units linked by covalent bonds by their main chains, at least one of the block of V units and of the block of N units optionally comprising at least one M unit and optionally at least one P unit, linked by covalent bonds by their main chains, said blocks being connected to each other by covalent bonds by their main chains in linear sequences.

The block copolymer may be written in the form:

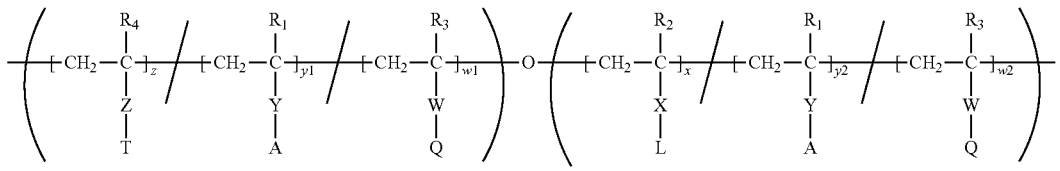

Preferably, the block copolymer comprises a single block of V units and a single block of N units, at least one of the block of V units and the block of N units optionally comprising at least one M unit and/or one P unit. When present, the number y1 of M units and the number w1 of P units in the block of V units may vary from the number y2 of M units and the number w2 of P units respectively in the block of N units.

Preferably, the P units are integrated and distributed within the block formed of N units, for example by statistical copolymerization of P units with the N units to form a single block formed mostly of N units and integrated in a block of N units.

Preferably, the M units are integrated and distributed within the block formed of N units, for example by statistical copolymerization of M units with the N units to form a single block formed mostly of N units and integrated in a block of N units.

Advantageously, the identical or different W, X, Y, Z moieties are chosen from the group comprising $C_1$-$C_{20}$ ester groups, preferably $C_2$-$C_{10}$, more preferably $C_2$-$C_8$, and even more preferably $C_2$-$C_5$, preferably linear alkyl ester groups, amide groups, and styrene derivative groups.

Preferably, T, which is identical or different, is a UV-absorbing moiety or a fluorophore. Such moieties make it possible, for example, to determine the concentration of copolymer by spectroscopy. It is evident that any other type of tracer followed by suitable detection and analysis means can be used.

Advantageously, T, which is identical or different, is a UV-absorbing moiety derived from a compound selected from the group comprising benzotriazoles, triazines, phenones (especially benzophenone, acetophenone, hydroxyalkylphenone, hydroxyarylphenone, aminoalkyl phenone, anthraquinone), acylphosphine oxides.

Advantageously, T, which may be identical or different, is a fluorophore moiety derived from a compound chosen from the group comprising fluorescein, a naphtyl, anthracene, coumarin, rhodamine, a fluorobenzoate.

The A functional groups of interest are capable of reaction with the substrate surface to be coated with epilame, so as to form anchoring moieties for the epilame agent at the substrate surface. Advantageously, A groups may be provided at the end of the copolymer.

Advantageously, the copolymer comprises at least two different A groups.

The L functional groups of interest are responsible for the epilame effect. They comprise at least one halogen atom, preferably a fluorine atom. Preferably, L is a carbon moiety, namely a $C_2$-$C_{20}$, preferably $C_4$-$C_{10}$, and more preferably $C_5$-$C_9$ alkyl chain, which may be cyclic, preferably with no heteroatom. L is partially or completely halogenated. Advantageously, L is an at least partially fluorinated and preferably completely fluorinated moiety. L may also comprise a hydrogen atom in the end group. L is preferably a perfluorinated alkyl chain.

The Q functional groups of interest of the P units are used to modify the properties of the epilame agent and/or to provide other functions. For example, Q may be a preferably $C_8$-$C_{20}$ alkyl chain, used to modify the angle of contact obtained or a chain capable of forming cross-linking points in a complementary cross-linking step (step g). For example, the P units may be derived from stearyl methacrylate.

Preferably, the copolymer comprises, in mole percent, between 1% and 20%, preferably between 3% and 10% of V units, between 50% and 99%, preferably between 70% and 95% of N units, between 0% and 50%, preferably between 1% and 20%, and more preferably between 5% and 20% of M units, and between 0% and 50%, preferably between 0% and 20%, and more preferably between 0% and 10% of P units, the percentages being expressed with respect to the total number of units (w+x+y+z).

Advantageously, the copolymer comprises between 10 and 350 units (w+x+y+z).

In a particularly advantageous manner, the M, N, P units are chosen to bear several different types of A groups, several L groups, preferably of the same type, and possibly one or more Q groups, which may be identical or of a different type, so as to refine and improve the properties of the epilame agent, in order to obtain more specifically a universal epilame agent exhibiting improved affinity with the substrate.

Preferably, the substrate surface, at least part of which is coated with the epilame agent, is made of a material chosen from the group comprising metals, doped or undoped metal oxides, polymers, sapphire, ruby, silicon, silicon oxides, silicon nitrides, silicon carbides, DLC (Diamond like carbon), and their alloys.

More specifically, the substrate surface may be made of steel, of noble metals such as gold, rhodium, palladium, platinum, or doped or undoped metal oxides of aluminium, zirconium, titanium, chromium, manganese, magnesium, iron, nickel, copper, zinc, molybdenum, silver, tungsten, or of polyoxymethylene or acrylamide, and their alloys.

The invention also concerns a method for coating with epilame at least one part of a substrate surface comprising the steps of:

a) preparing an epilame-coating bath containing an epilame agent comprising at least one copolymer as defined above b) optionally, preparing the substrate surface, particularly by cleaning in accordance with standard watchmakers' methods c) monitoring the concentration of epilame agent in the epilame-coating bath by means of the tracer group d) optionally readjusting the concentration of epilame agent in the epilame-coating bath e) placing the substrate surface in contact with the epilame agent in the epilame-coating bath f) drying.

It is evident that step a) can be implemented remote in time from the other steps b), c), d) and f). Preferably, for example when the epilame coating process is performed continuously or when the same epilame-coating bath is used several times, steps c) and d) can be repeated in order to monitor the concentration of epilame agent over time and maintain the concentration constant for implementation of step e).

Advantageously, when the T moiety is a UV-absorbing moiety or a fluorophore, the concentration of epilame agent is determined by spectroscopy (for example by measuring absorbance). In an intermediate step, prior to step c) a copolymer calibration curve is produced. Thus, the copolymer is dissolved in different concentrations in a solvent (the same solvent as that used to make the epilame agent solution) and for each solution absorbance is measured by spectroscopy as function of wavelength.

The wavelength at which absorbance is maximum is noted and then the calibration curve A=F (concentration) is drawn at the wavelength at which absorbance is maximum. The molar extinction coefficient of the polymer is deduced (Beer-Lambert law $A=\varepsilon cl$).

To check the concentration of epilame agent in the epilame-coating bath in step c), it is sufficient to measure the bath solution absorbance by spectroscopy, and then using the previously prepared calibration curve to deduce therefrom the concentration of epilame agent in the epilame-coating bath. The operator can therefore add solvent or a concentrated solution of epilame agent to precisely readjust the concentration, in accordance with step d). In a continuous epilame-coating process, for example, or when the same epilame-coating bath is used several times, checking the concentration of epilame agent several times makes it possible to track the evolution of the concentration of epilame agent over time in order to keep it constant.

Preferably, the epilame agent is prepared by statistical or block copolymerization of monomers capable of forming the V units with monomers capable of forming the N units, optionally with monomers capable of forming at least one M unit and optionally with monomers capable of forming at least one P unit.

Statistical copolymerization techniques are well known to those skilled in the art and do not require detailed description. A particularly suitable polymerization mode for statistical copolymerization is free-radical copolymerization, in solution or in emulsion.

According to a first variant, statistical copolymerization can be obtained in a single step by copolymerization, preferably radical-copolymerization, of monomers bearing the Z-T side chains with monomers bearing the X-L side chains and possibly monomers bearing the Y-A side chains and/or possibly monomers bearing the W-Q side chains.

According to another variant, the statistical copolymer may be obtained by copolymerization, preferably radical-polymerization, of monomers bearing the appropriate Z side chains with monomers bearing the appropriate X side chains and possibly monomers bearing side chains intended to bear A and/or possibly monomers bearing side chains intended to bear Q, the side chains are then modified after polymerization (post-functionalization), for example by click chemistry, to introduce the T, L functional groups of interest, and the A and/or Q groups.

A particularly suitable polymerization mode for block copolymerization is the controlled successive copolymerization of:
- monomers capable of forming at least one block of V units and optionally with monomers capable of forming at least one M unit and/or monomers capable of forming at least one P unit
- monomers capable of forming at least one block of N units, and optionally with monomers capable of forming at least one M unit and/or monomers capable of forming at least one P, M or P unit identical or different.

Two particularly suitable polymerization modes for block copolymerization are atom-transfer radical-polymerization (ATRP) and reversible addition-fragmentation chain-transfer polymerisation (RAFT), in solution or emulsion).

According to a first variant, the block copolymer may be obtained by polymerization, preferably controlled radical polymerization, of monomers bearing the Z-T side chains possibly with monomers bearing the Y-A side chains and/or possibly monomers bearing the W-Q side chains, followed by copolymerization, preferably controlled radical polymerization, of monomers bearing the X-L side chains possibly with monomers bearing the Y-A side chains and/or possibly monomers bearing the identical or different W-Q, Y-A and W-Q side chains.

According to another variant, the block copolymer may be obtained by polymerization, preferably controlled radical polymerization, of monomers bearing the appropriate Z side chains possibly with monomers bearing the side chains intended to bear A and/or possibly monomers bearing side chains intended to bear Q, followed by copolymerization, preferably radical-polymerization, of monomers bearing the appropriate X side chains possibly with monomers bearing side chains intended to bear A and/or possibly monomers bearing side chains intended to bear Q, the side chains are then modified, for example by click chemistry, to introduce the T, L functional groups of interest, and the A and/or Q groups.

Preferably, the monomers are chosen from the group comprising acrylate, methacrylate, acrylamide, methacrylamide, vinyl, diene, styrene and olefinic monomers. Acrylate, methacrylate, acrylamide, methacrylamide, vinyl and styrene monomers are particularly preferred. These products are known and mostly available on the market or can be accessed in a synthesis step.

The monomers particularly preferred for forming the V units comprising a tracer group T are selected from the group comprising 2-H-benzotriazol-2-yl-hydroxyphenyl ethyl methacrylate, 2-(2H-Benzotriazol-2-yl)-4-methyl-6-(2-propenyl)phenol, 2-(4-Benzoyl-3-hydroxyphenoxy)ethyl acrylate, 4-Allyloxy-2-hydroxybenzophenone, 2-Naphthyl (meth)acrylate, Fluorescein O-(meth)acrylate, 9-Anthracenylmethyl (meth)acrylate, Ethidium bromide-N,N'-bisacrylamide, N-(1-Naphthyl)-N-phenylmethacrylamide, 7-[4-(Trifluoromethyl)coumarin]methacrylamide. Such monomers are commercially available and are polymerizable.

Even more preferentially, the monomers for forming the V units comprising a tracer group T are selected from the group comprising 2-H-benzotriazole-2-yl-hydroxyphenyl ethyl methacrylate, 2-(2H-Benzotriazol-2-yl)-4-methyl-6-(2-propenyl)phenol, 2-(4-Benzoyl-3-hydroxyphenoxy)ethyl acrylate, 4-Allyloxy-2-hydroxybenzophenone These monomers comprise tracer groups that can be tracked by UV visible spectroscopy, which is much easier to implement in an industrial environment than fluorescence spectroscopy.

The monomers particularly preferred for forming the N, M and P units are:

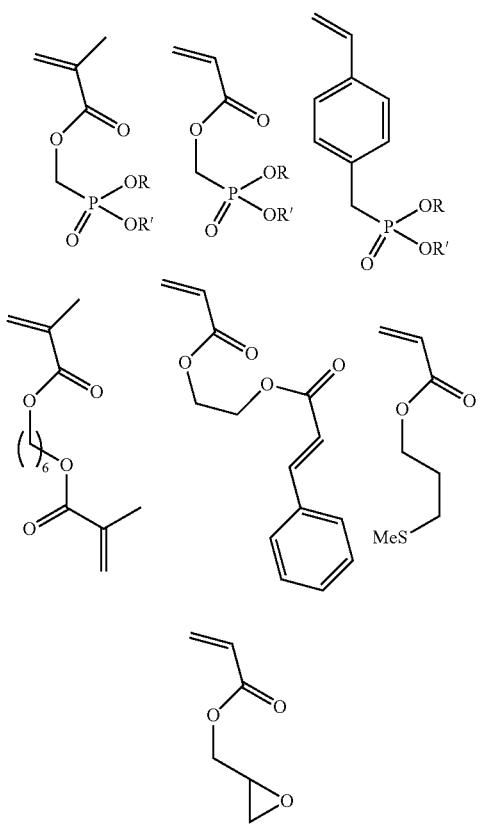

R is equal to or different from R'=H, alkyl, Si(Me)₃

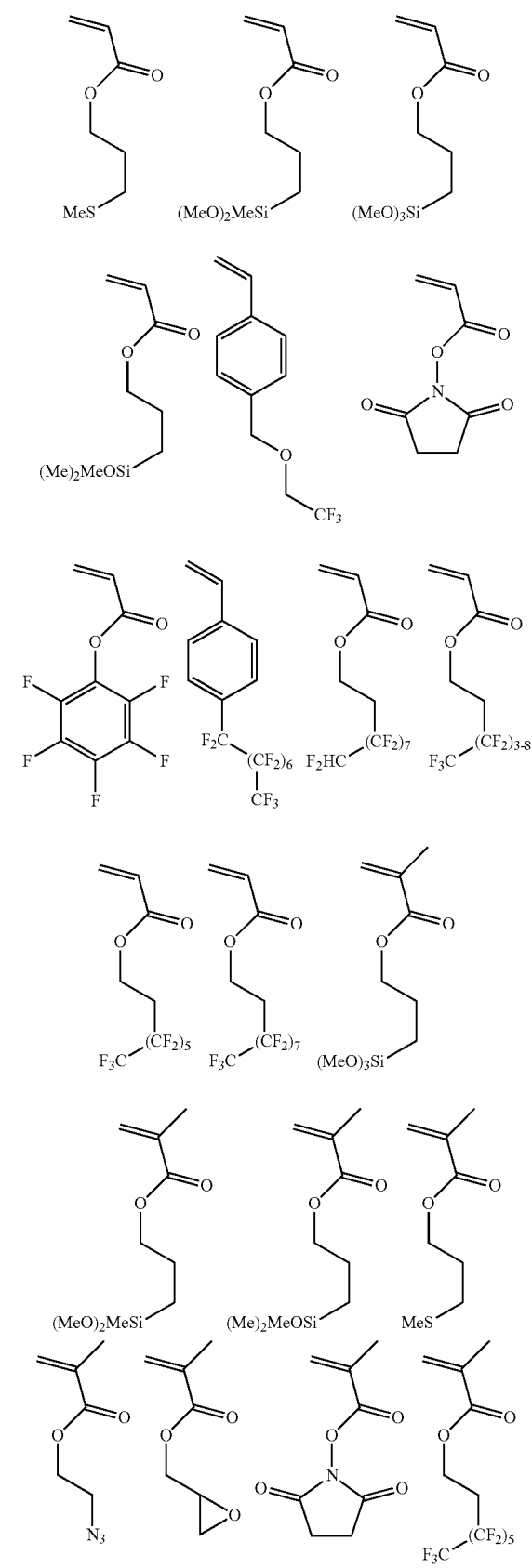

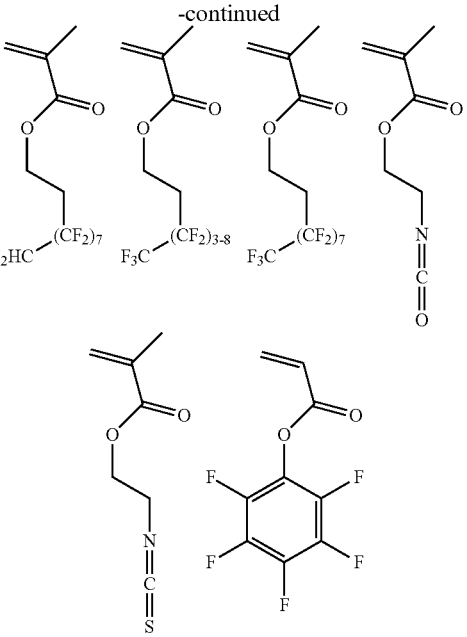

Thus, the copolymer used as the epilame agent can easily be obtained in a single step or a limited number of steps from commercially available products.

One of the copolymers preferably used in the present invention is a statistical copolymer which has the following structure (I):

(I)

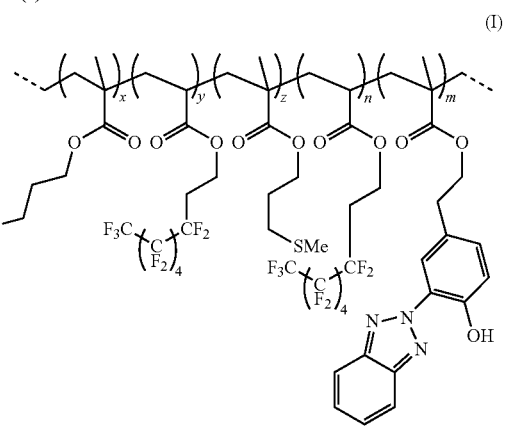

Another copolymer preferably used in the present invention is a statistical copolymer which has the following structure (II):

(II)

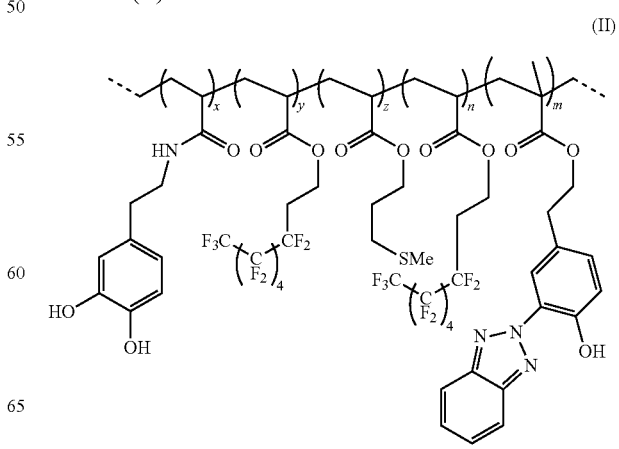

The copolymers used in the invention can be obtained in powder or viscous liquid form. They can then be placed in a fluorinated solvent solution, such as perfluorinated or fluorinated hydrocarbons, perfluoropolyethers, hydrofluoroolefins, hydrofluoroethers, in concentrations preferably comprised between 50 mg/L and 250 mg/L, to obtain an epilame agent solution which will be used to treat the surfaces to be coated with epilame.

In variants, the epilame-coating method according to the invention further comprises, after step e), and preferably after step f), a complementary cross-linking step g), made possible, in particular, by the presence of the appropriate functional groups of interest provided in the Q side chains of the P units.

The substrate according to the invention has a surface coated with an epilame agent that is simple and economical to synthesize, exhibiting affinity with any substrate type and improved resistance to cleaning operations compared to known epilame agents. An element or a piece with a substrate according to the invention may be used in any type of application in the field of mechanics, and more particularly in precision mechanics, and particularly in horology and jewellery.

The method according to the invention makes it possible to monitor and track the concentration of epilame agent in the epilame-coating bath over time in order to suitably readjust the epilame agent composition of the epilame-coating bath. Thus, the concentration of epilame agent in the epilame-coating bath is substantially constant so that the epilame effects are constant in every batch treated. A robust epilame-coating process is thus obtained.

The following examples illustrate the present invention without thereby limiting its scope.

3-methacryloxypropyl methyl thioether synthethis: (in a similar operating mode to that described in U.S. Pat. No. 6,552,103)
Thiomethylpropanal (4.05 mL), dichloromethane (100 mL) and triethylamine (8.2 mL) are added to a three neck distilling flask, with magnetic stirring, placed under nitrogen atmosphere. The solution is cooled in an ice bath and then methacrylate chloride (3.8 mL) is added dropwise over 10 minutes. The reaction mixture is stirred for 2 hours at 0° C. and then at ambient temperature throughout the night. 70 mL of water is added and the reaction mixture is then transferred to a separatory funnel. The organic phase and the aqueous phase are separated. The organic phase is washed with an HCl solution (pH=4) until pH=7 is achieved and then dried over $Na_2SO_4$. The solvent is then removed in a rotary evaporator to yield the expected product with a 97% yield.

$RMN^1H$ ($CDCl_3$, 500 MHz): chemical shift (ppm): 6.10 (s, 1H), 5.56 (s, 1H), 4.24 (t, 2H), 2.58 (t, 2H), 2.11 (s, 3H), 1.99 (m, 2H), 1.94 (s, 3H)

EXAMPLE 1

An epilame agent in the form of a statistical copolymer is synthesized by the free-radical polymerization of:
(3-methacryloxopropyl)dimethyl-methoxysilane
1H,1H,2H,2H-Perfluorooctyl acrylate
3-methacryloxypropyl methyl thioether (prepared as set out above)
2-[3-(2H-Benzotriazol-2-yl)-4-hydroxyphenyl]ethyl methacrylate according to the following procedure:
2-[3-(2H-Benzotriazol-2-yl)-4-hydroxyphenyl]ethyl methacrylate (148 mg), (3-methacryloxopropyl)dimethyl-methoxysilane (166 µL), 3-Methacryloxopropyl methythioether (111 µL) and then 1H,1H,2H,2H-Perfluorooctylacrylate (2.0 mL) are added to a Schlenk flask containing cyclohexanone (2 mL) previously degassed with nitrogen. The reaction medium is sparged with nitrogen for 5 minutes, then 0.8 mL of hydrofluoroether (Novec™ HFE-7200 3M™), previously sparged with nitrogen, is added. 0.5 mL of a 0.228 mol/L solution of azobisisobutyronitrile (AIBN) is added. The reaction medium is stirred and heated to 80° C. for 3 hours. The polymer is coagulated in methanol and then rinsed with 3*30 mL of methanol. The polymer is obtained in the form of a slightly off-white gel (yield=95%).

The following statistical copolymer (I) is obtained:

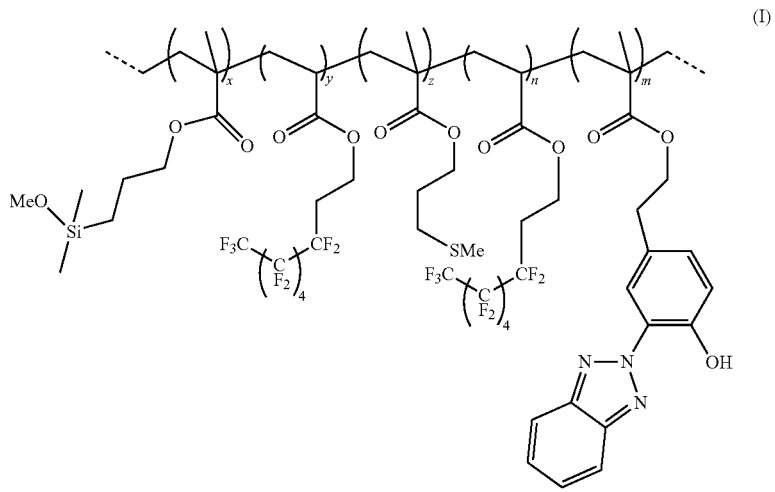

(I)

UV Absorbance Measurement

Figure 2:
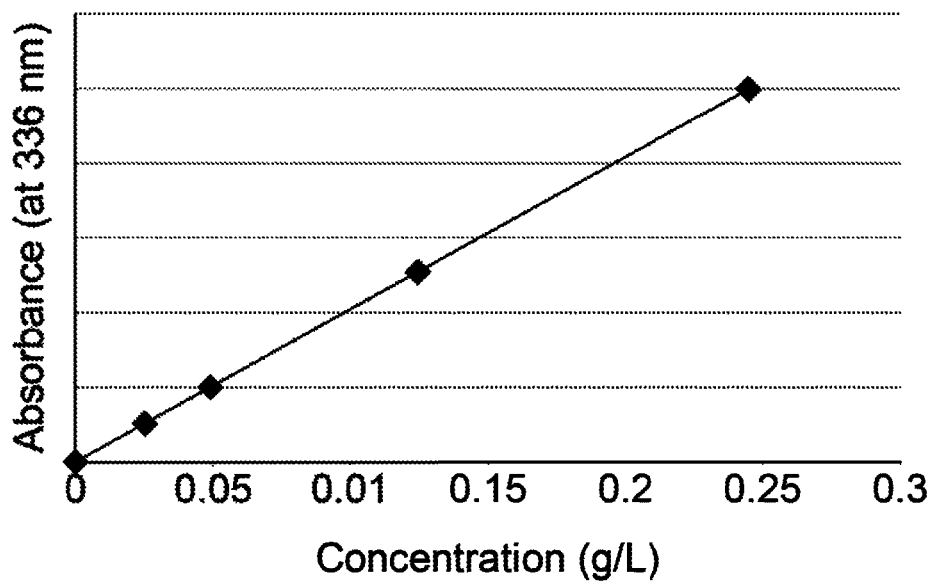
FIG. 2 is the calibration curve for the copolymer I representing absorbance as a function of concentration at the wavelength $\lambda=336$ nm.

The copolymer (I) is dissolved in various concentrations in an Ecosolv (Moebius) type fluorinated solvent, identical to the solvent used in the epilame-coating bath. Absorbance is measured for each concentration by UV-visible spectroscopy. The curves represented in FIG. 1 are obtained. The wavelength at which absorbance is maximum is identified as 336 nm, which makes it possible to determine the molar absorption coefficient of the polymer at maximum absorption at 336 nm. A calibration curve can then be produced, as shown in FIG. 2, representing absorbance as a function of the concentration of copolymer. Thereafter this calibration curve makes it possible to determine the concentration of copolymer in the epilame-coating bath at any time, by a simple absorbance measurement by UV-visible spectroscopy, performed on samples taken from the epilame-coating bath. Depending on the result obtained, the operator knows whether he needs to add solvent or concentrated epilame agent solution in order to precisely readjust the concentration of epilame agent to keep a substantially constant concentration during the epilame-coating process.

EXAMPLE 2

An epilame agent in the form of a statistical copolymer is synthesized by the free-radical polymerization of:
- 2-(2,2-Diphenyl-benzo[1,3]dioxo-5-yl)-ethyl-acrylate (obtained by reaction between -(2,2-Diphenyl-benzo[1,3]dioxo-5-yl)-ethylamine (commercially available) and acryloyl chloride)
- 1H,1H,2H,2H-Perfluorooctyl acrylate
- 3-acryloxypropyl methyl thioether (obtained using the procedure described in the literature: Preparation of biomimetic polymer hydrogel materials for contact lenses, Bertozzi, Carolyn et al. U.S. Pat. No. 6,552,103)
- 2-[3-(2H-Benzotriazol-2-yl)-4-hydroxyphenyl]ethyl methacrylate according to the following procedure:

2-[3-(2H-Benzotriazol-2-yl)-4-hydroxyphenyl]ethyl methacrylate (162 mg), 2-(2,2-Diphenyl-benzo[1,3]dioxo-5-yl)-ethyl-acrylate (373 mg), 3-acryloxopropyl methylthioether (111 µL) and then 1H,1H,2H,2H-Perfluorooctylacrylate (2.1 mL) are added to a Schlenk flask containing cyclohexanone (2 mL) previously degassed with nitrogen. The reaction medium is sparged with nitrogen for 5 minutes, then 0.8 mL of hydrofluoroether (Novec™ HFE-7200 3M™), previously sparged with nitrogen, is added. 0.55 mL of a 0.228 mol/L solution of azobisisobutyronitrile (AIBN) is added. The reaction medium is stirred and heated to 80° C. for 3 hours. The polymer is coagulated in methanol and then rinsed with 3*30 mL of methanol. The polymer is obtained in the form of a slightly off-white gel (yield=92%).

The following statistical copolymer is obtained:

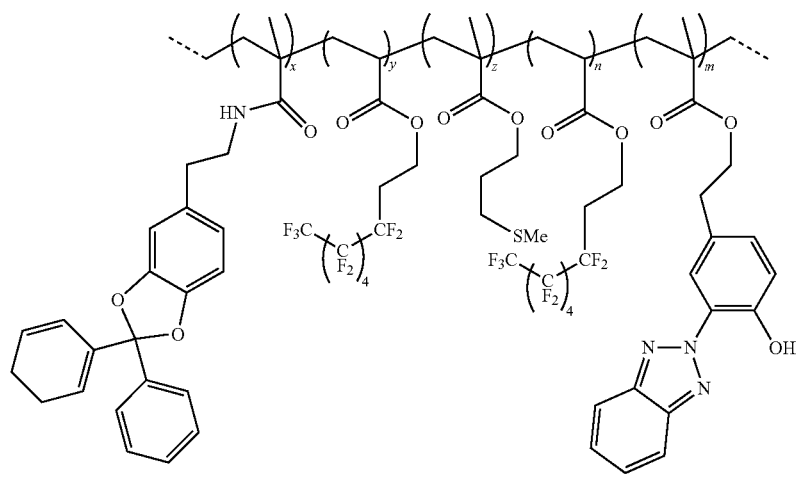

The group protecting the catechol function of the polymer is then removed (deprotection of the catechol function) according to the following procedure:

The previously obtained polymer is solubilized in 50 mL of fluorinated solvent (Novec™ HFE-7200 3M™), then 5 mL of Trifluoroacetic acid is added under stirring. The reaction is left under stirring for 1 hour. The mixture is then washed with 4×40 mL of water, the organic phases are collected and then the fluorinated solvent is reduced to a minimum. The polymer is coagulated in methanol and then rinsed with 3*30 mL of methanol. The polymer is obtained in the form of a slightly off-white gel (yield=75%).

The following statistical copolymer (II) is obtained:

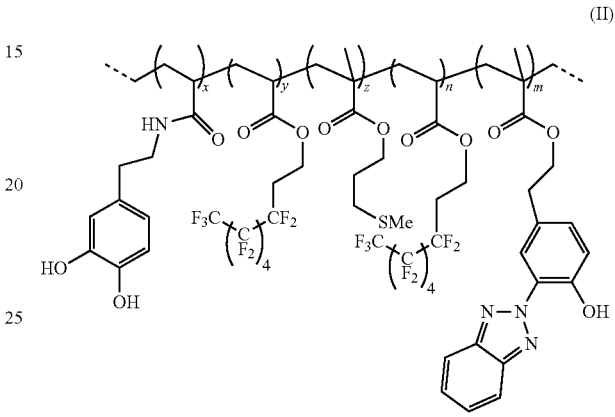

(II)

UV Absorbance Measurement

Figure 3:
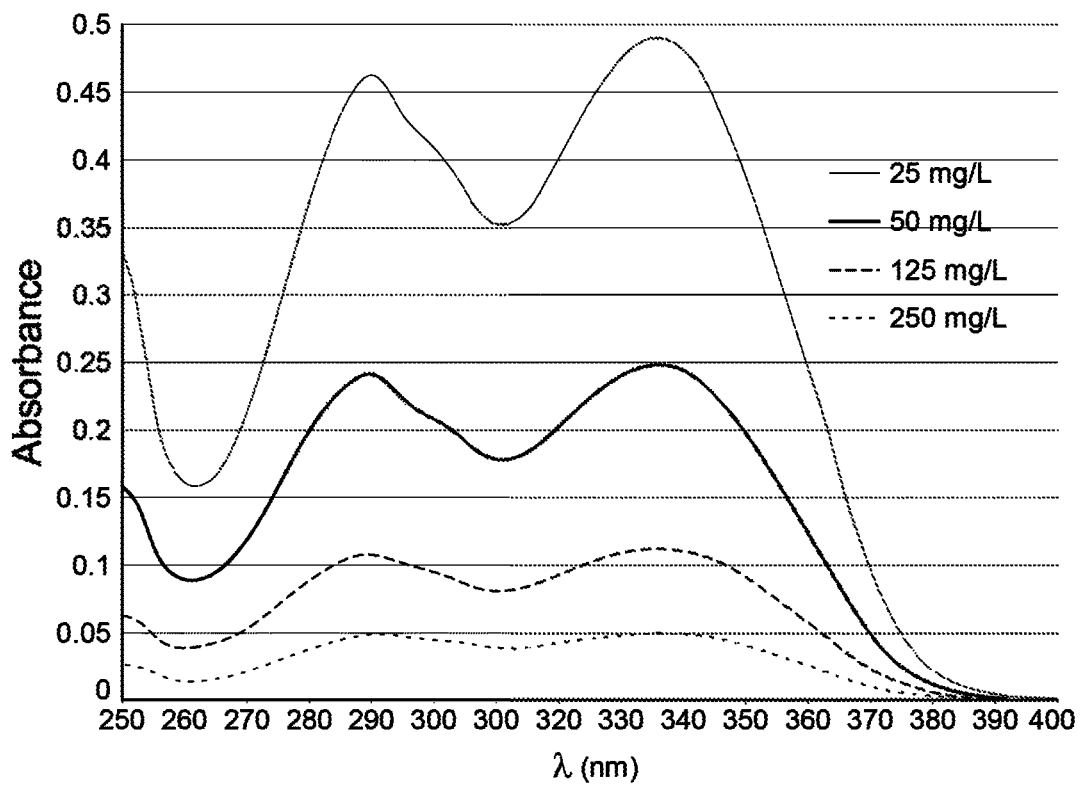
FIG. 3 represents absorbance curves as a function of wavelength for different concentrations of the copolymer II in a solvent.
Figure 4:
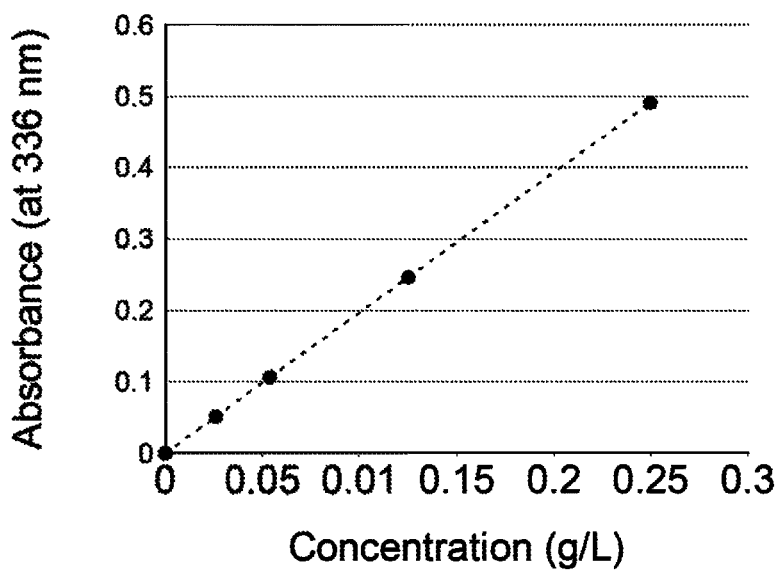
FIG. 4 is the calibration curve for the copolymer II representing absorbance as a function of concentration at the wavelength $\lambda=336$ nm.

The copolymer (II) is dissolved in various concentrations in an Ecosolv (Moebius) type fluorinated solvent, identical to the solvent used in the epilame-coating bath. Absorbance is measured for each concentration by UV-visible spectroscopy. The curves represented in FIG. 3 are obtained. The wavelength at which absorbance is maximum is identified as 336 nm, which makes it possible to determine the molar absorption coefficient of the polymer at maximum absorption at 336 nm. A calibration curve can then be produced, as shown in FIG. 4, representing absorbance as a function of the concentration of copolymer. Thereafter this calibration curve makes it possible to determine the concentration of copolymer in the epilame-coating bath at any time, by a simple absorbance measurement by UV-visible spectroscopy, performed on samples taken from the epilame-coating bath. Depending on the result obtained, the operator knows whether he needs to add solvent or concentrated epilame agent solution in order to precisely readjust the concentration of epilame agent to keep a substantially constant concentration during the epilame-coating process.

What is claimed is:

1. A copolymer comprising V units, N units, at least one M unit and optionally at least one P unit, linked by covalent bonds by their main chains, wherein

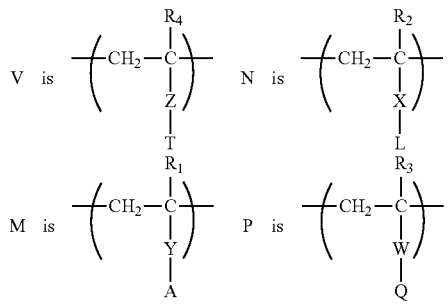

where $R_1, R_2, R_3, R_4$, which may be identical or different, are each selected from the group consisting of H, a $C_1$-$C_{10}$ alkyl group, and a $C_1$-$C_{10}$ alkenyl group, W, X, Y, Z, which may be identical or different, are spacer arms formed of a heteroatom or of a hydrocarbon chain that may contain at least one linear or branched heteroatom group comprising at least one carbon atom T, which may be identical or different, is a tracer group arranged to determine the concentration of copolymer in a medium L, which may be identical or different, is a halogenated $C_1$-$C_{20}$ carbon moiety A, which may be identical or different, forms an anchoring moiety for the substrate, and is chosen from the group consisting of thiols, thioethers, thioesters, sulphides, thioamides, silanols, alkoxysilanes, silane halides, hydroxyls, phosphates, protected or non-protected phosphonic acids, protected or non-protected phosphonates, amines, ammoniums, nitrogenated heterocycles, carboxylic acids, anhydrides, and catechol Q, which may be identical or different, is selected from the group consisting of H, $CH_3$, and a hydrocarbon chain that may contain at least one linear or branched, saturated or unsaturated heteroatom group, comprising at least 2 carbon atoms, wherein the copolymer comprises, in molar percent, between 3% and 10% of V units, between 70% and 95% of N units, between 1% and 20% of M units, and between 0% and 20% of P units.

2. The copolymer according to claim 1, wherein $R_1, R_2, R_3, R_4$, which may be identical or different, are H or $CH_3$.

3. The copolymer according to claim 1, wherein L, which may be identical or different, is a fluorinated $C_1$-$C_{20}$ carbon moiety.

4. The copolymer according to claim 1, wherein W, X, Y, Z, which may be identical or different, are selected from the group consisting of $C_1$-$C_{20}$ ester groups, amide groups, and styrene derivative groups.

5. The copolymer according to claim 1, wherein T, which may be identical or different, is a UV-absorbing group or a fluorophore.

6. The copolymer according to claim 1, wherein T, which may be identical or different, is a UV-absorbing group derived from a compound selected from the group consisting of benzotriazoles, triazines, phenones, and acylphosphine oxides.

7. The copolymer according to claim 1, wherein T, which may be identical or different, is a fluorophore moiety derived from a compound chosen from the group consisting of fluorescein, a naphtyl, anthracene, coumarin, rhodamine, and a fluorobenzoate.

8. The copolymer according to claim 1, wherein L is a $C_2$-$C_{20}$ carbon moiety.

9. The copolymer according to claim 8, wherein L is a $C_4$-$C_{20}$ carbon moiety.

10. The copolymer according to claim 1, wherein L is an at least partially fluorinated moiety.

11. The copolymer according to claim 10, wherein L is a completely fluorinated moiety.

12. The copolymer according to claim 1, wherein the copolymer comprises between 10 and 350 units.

13. A method for coating with epilame at least one part of a substrate surface, the method comprising:
    a) preparing an epilame-coating bath containing an epilame agent comprising at least one copolymer according to claim 1;
    b) optionally, preparing the substrate surface;
    c) monitoring the concentration of epilame agent in the epilame-coating bath by means of the tracer group;
    d) optionally readjusting the concentration of epilame agent in the epilame-coating bath;
    e) placing the substrate surface in contact with the epilame agent in the epilame-coating bath; and
    f) drying.

14. The epilame-coating method according to claim 13, wherein said epilame-coating method is continuous and wherein steps c) and d) are repeated over time.

15. The epilame-coating method according to claim 13, wherein the preparation of the epilame agent is achieved by copolymerization of monomers capable of forming the V units with monomers capable of forming the N units, with monomers capable of forming at least one M unit and optionally with monomers capable of forming at least one P unit.

16. The epilame-coating method according to claim 13, wherein after step e), the method also comprises a complementary cross-linking step g).

17. The epilame-coating method according to claim 13, wherein the monomers are selected from the group consisting of acrylate, methacrylate, acrylamide, methacrylamide, vinyl and styrene monomers.

18. A method for coating with epilame at least one part of a substrate surface, the method comprising:
    a) preparing an epilame-coating bath containing an epilame agent comprising at least one copolymer;
    b) optionally, preparing the substrate surface;
    c) monitoring the concentration of epilame agent in the epilame-coating bath by means of the tracer group;
    d) optionally readjusting the concentration of epilame agent in the epilame-coating bath;
    e) placing the substrate surface in contact with the epilame agent in the epilame-coating bath; and
    f) drying,
    wherein the copolymer comprises V units, N units, optionally at least one M unit and optionally at least one P unit, linked by covalent bonds by their main chains, wherein

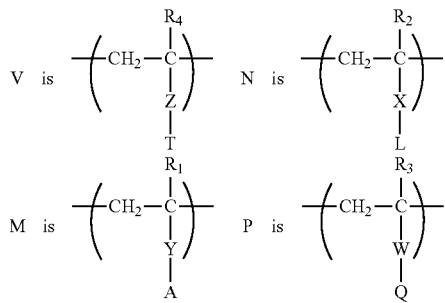
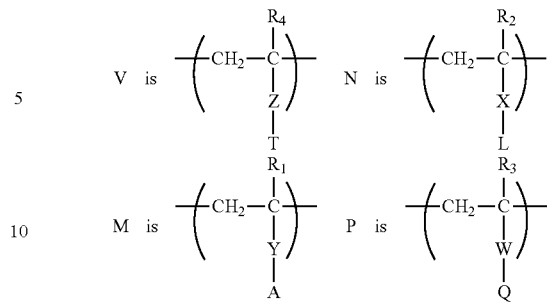

where $R_1$, $R_2$, $R_3$, $R_4$, which may be identical or different, are each selected from the group consisting of H, a $C_1$-$C_{10}$ alkyl group, and a $C_1$-$C_{10}$ alkenyl group, W, X, Y, Z, which may be identical or different, are spacer arms formed of a heteroatom or of a hydrocarbon chain that may contain at least one linear or branched heteroatom group comprising at least one carbon atom T, which may be identical or different, is a tracer group arranged to determine the concentration of copolymer in a medium L, which may be identical or different, is a halogenated $C_1$-$C_{20}$ carbon moiety A, which may be identical or different, forms an anchoring moiety for the substrate, and is chosen from the group consisting of thiols, thioethers, thioesters, sulphides, thioamides, silanols, alkoxysilanes, silane halides, hydroxyls, phosphates, protected or non-protected phosphoric acids, protected or non-protected phosphonates, amines, ammoniums, nitrogenated heterocycles, carboxylic acids, anhydrides, and catechol Q, which may be identical or different, is selected from the group consisting of H, $CH_3$, and a hydrocarbon chain that may contain at least one linear or branched, saturated or unsaturated heteroatom group, comprising at least 2 carbon atoms.

19. The epilame-coating method according to claim 18, wherein said epilame-coating method is continuous and wherein steps c) and d) are repeated over time.

20. The epilame-coating method according to claim 18, wherein the preparation of the epilame agent is achieved by copolymerization of monomers capable of forming the V units with monomers capable of forming the N units, optionally with monomers capable of forming at least one M unit and optionally with monomers capable of forming at least one P unit.

21. The epilame-coating method according to claim 18, wherein after step e), the method also comprises a complementary cross-linking step g).

22. The epilame-coating method according to claim 18, wherein the monomers are selected from the group consisting of acrylate, methacrylate, acrylamide, methacrylamide, vinyl and styrene monomers.

23. A substrate comprising a surface at least one part of which is coated with an epilame agent, wherein said epilame agent comprises at least one compound in the form of a copolymer comprising V units, N units, at least one M unit and optionally at least one P unit, linked by covalent bonds by their main chains, wherein where $R_1$, $R_2$, $R_3$, $R_4$, which may be identical or different, are selected from the group consisting of H, a $C_1$-$C_{10}$ alkyl group, and a $C_1$-$C_{10}$ alkenyl group W, X, Y, Z, which may be identical or different, are spacer arms formed of a heteroatom or of a hydrocarbon chain that may contain at least one linear or branched heteroatom group comprising at least one carbon atom T, which may be identical or different, is a tracer group arranged to determine the concentration of epilame agent in an epilame-coating bath L, which may be identical or different, is a halogenated $C_1C_{20}$ carbon moiety A, which may be identical or different, forms an anchoring moiety for the substrate, and is chosen from the group consisting of thiols, thioethers, thioesters, sulphides, thioamides, silanols, alkoxysilanes, silane halides, hydroxyls, phosphates, protected or non-protected phosphoric acids, protected or non-protected phosphonates, amines, ammoniums, nitrogenated heterocycles, carboxylic acids, anhydrides, and catechol Q, which may be identical or different, is selected from the group consisting of H, $CH_3$ and a hydrocarbon chain that may contain at least one linear or branched, saturated or unsaturated heteroatom group, comprising at least 2 carbon atoms, wherein the copolymer comprises, in molar percent, between 3% and 10% of V units, between 70% and 95% of N units, between 1% and 20% of M units, and between 0% and 20% of P units.

24. The substrate according to claim 23, wherein $R_1$, $R_2$, $R_3$, $R_4$, which may be identical or different are H or $CH_3$.

25. The substrate according to claim 23, wherein L, which may be identical or different, is a fluorinated $C_1$-$C_{20}$ carbon moiety.

26. The substrate according to claim 23, wherein W, X, Y, Z, which may be identical or different, are selected from the group consisting of $C_1$-$C_{20}$ ester groups, amide groups, and styrene derivative groups.

27. The substrate according to claim 23, wherein T, which may be identical or different, is a UV-absorbing group derived from a compound selected from the group consisting of benzotriazoles, triazines, phenones, and acylphosphine oxides.

28. The substrate according to claim 23, wherein T, which may be identical or different, is a fluorophore moiety derived from a compound chosen from the group consisting of fluorescein, a naphtyl, anthracene, coumarin, rhodamine, and a fluorobenzoate.

29. The substrate according to claim 23, wherein L is a $C_2$-$C_{20}$ carbon moiety.

30. The substrate according to claim 29, wherein L is a $C_4$-$C_{10}$ carbon moiety.

31. The substrate according to claim 23, wherein L is an at least partially fluorinated moiety.

32. The substrate according to claim 31, wherein L is a completely fluorinated moiety.

33. The substrate according to claim 23, wherein the copolymer comprises between 10 and 350 units.

34. The substrate according to claim 23, wherein the surface thereof, at least part of which is coated with the epilame agent, is made of a material chosen from the group consisting of metals, metal oxides, polymers, sapphire, ruby, silicon, silicon oxides, silicon nitrides, silicon carbides, DLC (Diamond like carbon), and alloys thereof.

35. A timepiece or piece of jewellery comprising an element comprising a substrate according to claim 23.

* * * * *

UNITED STATES PATENT AND TRADEMARK OFFICE
CERTIFICATE OF CORRECTION

PATENT NO. : 10,385,155 B2
APPLICATION NO. : 15/672510
DATED : August 20, 2019
INVENTOR(S) : Christophe Letondor et al.

It is certified that error appears in the above-identified patent and that said Letters Patent is hereby corrected as shown below:

In the Claims

In Column 20, Line 10 approx., Claim 7, "naphtyl," should read -- naphthyl, --.

In Column 20, Line 15 approx., Claim 9, "$C_4$-$C_{20}$" should read -- $C_4$-$C_{10}$ --.

In Column 21, Line 34 approx., Claim 18, "phosphoric" should read -- phosphonic --.

In Column 22, Line 26 approx., Claim 23, "$C_1C_{20}$" should read -- $C_1$-$C_{20}$ --.

In Column 22, Line 33 approx., Claim 23, "phosphoric" should read -- phosphonic --.

In Column 22, Line 37 approx., Claim 23, "$CH_3$" should read -- $CH_3$, --.

In Column 22, Line 62, Claim 28, "naphtyl," should read -- naphthyl, --.

Signed and Sealed this
Fourth Day of February, 2020

Andrei Iancu
*Director of the United States Patent and Trademark Office*